United States Patent [19]

Ohta et al.

[11] Patent Number: 5,540,451
[45] Date of Patent: Jul. 30, 1996

[54] COMPOSITE SEALING MATERIAL

[75] Inventors: Kazuo Ohta; Shunichi Kiyosawa, both of Tokyo; Shoji Seike, Nagoya; Toshiichi Ikami, Konan; Tatsuya Hishiki, Nagoya, all of Japan

[73] Assignees: Tokyo Electric Power Services Co., Ltd.; NGK Insulators, Ltd.

[21] Appl. No.: 329,944

[22] Filed: Oct. 26, 1994

[30] Foreign Application Priority Data

Nov. 2, 1993 [JP] Japan .................... 5-274539
Oct. 19, 1994 [JP] Japan .................... 6-253585

[51] Int. Cl.⁶ .................................... F16J 15/20
[52] U.S. Cl. .................... 277/229; 277/DIG. 6; 428/403; 428/404
[58] Field of Search .................... 277/229, 227, 277/DIG. 6, 102, 115, 72 FM, 235 A; 428/403, 404, 406, 407, 408

[56] References Cited

U.S. PATENT DOCUMENTS

| 266,031 | 10/1882 | Haas | 277/102 |
| 861,127 | 7/1907 | Kleckner | 277/102 |
| 982,182 | 1/1911 | Johnston | 277/115 |
| 1,580,212 | 4/1926 | McKeon et al. | 277/102 |
| 2,316,778 | 4/1943 | Fiechter . | |
| 2,363,688 | 11/1944 | Pollard | 277/227 |
| 3,492,197 | 1/1970 | Olstowski | 428/408 |
| 4,888,240 | 12/1989 | Graham et al. | 428/406 |

FOREIGN PATENT DOCUMENTS

| 0573251 | 12/1993 | European Pat. Off. . | |
| 0503861 | 7/1930 | Germany . | |
| 6-58425 | 3/1994 | Japan . | |
| 24049 | of 1901 | United Kingdom | 277/102 |
| 2077246 | 12/1981 | United Kingdom . | |

Primary Examiner—Scott W. Cummings
Attorney, Agent, or Firm—Parkhurst, Wendel & Burr

[57] ABSTRACT

In a composite sealing material having an inner portion and a carbon outer portion, a bulk density of the carbon outer portion is set in a range of 0.3~2.0 g/cm³, preferably in a range of 0.5~1.5 g/cm³, or fiber members are mixed in the carbon outer portion, or an oil layer is arranged on the carbon outer portion, or an organic layer or an inorganic layer is arranged on the carbon outer portion, so as to improve sealing properties of sealing members formed by using the composite sealing materials.

8 Claims, 1 Drawing Sheet

COMPOSITE SEALING MATERIAL

BACKGROUND OF THE INVENTION

1. Field of the Invention

The present invention relates to a composite sealing material to be used in sealing members for various valves, various pumps and the like.

2. Related Art Statement

Generally, valves set in pipes for steam, water, oil, chemicals and the like to be used in thermal power plants and the like, are arranged in very narrow spaces, high places, open-air spaces and the like. Therefore, it is very difficult to effect exchanging operations of sealing members of the valves. Moreover, various kinds of valves are used in the thermal power plants, and setting directions of the valves are varied as a horizontal direction, an inclined direction, a vertical direction and the like. From this point of view, it is also difficult to effect the exchanging operations of the sealing members.

As the sealing members mentioned above, a composite sealing material comprising an inner portion and an outer portion enveloping the inner portion, the inner portion being composed of a small ceramic discrete material and the like, and the outer portion being composed of a carbon base material, has been disclosed in Japanese Patent Laid-Open Publication Nos. 6-58,425 and 6-87,674 (U.S. patent application Ser. No. 8/68,674).

The composite sealing material mentioned above has at least a carbon outer portion, and thus it has sufficient sealing properties for the sealing members of the valves, pumps and the like mentioned above, since it is easily assembled and has good sealing properties. However, if the sealing member is formed by arranging a number of the composite sealing materials in a packing box, and pressing the composite sealing materials, the sealing members sometimes have insufficient sealing properties.

SUMMARY OF THE INVENTION

It is an object of the present invention to eliminate the drawbacks mentioned above and to provide a composite sealing material having improved sealing properties.

According to a first aspect of the invention, a composite sealing material having an inner portion and an outer portion enveloping said inner portion, said outer portion being at least composed of a carbon base material, is characterized in that said carbon outer portion has a bulk density of 0.3~2.0 g/cm$^3$.

According to a second aspect of the invention, a composite sealing material having an inner portion and an outer portion enveloping said inner portion, said outer portion being at least composed of a carbon base material, is characterized in that fiber members are mixed in said carbon outer portion.

According to a third aspect of the invention, a composite sealing material having an inner portion and an outer portion enveloping said inner portion, said outer portion being at least composed of a carbon base material, is characterized in that an oil layer is arranged on said carbon outer portion.

According to a fourth aspect of the invention, a composite sealing material having an inner portion and an outer portion enveloping said inner portion, said outer portion being at least composed of a carbon base material, is characterized in that an organic layer or an inorganic layer is arranged on said carbon outer layer.

In the constructions mentioned above, it is possible to improve sealing properties of the sealing member formed by using the composite sealing materials, which have been filed by the applicant, by investigating an influence of a bulk density of the carbon outer portion (first aspect), an influence of a mixing component in the carbon outer portion (second aspect), an influence of a coating on the carbon outer portion (third and fourth aspects).

The composite sealing material according to the invention can be applied to all the packing boxes into which the sealing members are to be arranged, even if dimensions of the packing boxes are varied. Therefore, in the sealing member formed by using the composite sealing materials, it is preferred as compared with the conventional sealing members, in that it is not necessary to prepare various sealing members having dimensions corresponding to those of various packing boxes.

Moreover, it is possible to control a volume reduction rate in a range of 30~80% by controlling the bulk density of the carbon outer portion from 0.3 g/cm$^3$ to 2.0 g/cm$^3$. Therefore, it is possible to obtain a sealing member having extremely good sealing properties.

Further, if use is made of ceramics, metals, plastics and solid carbons as the inner portion of the composite sealing material, the inner portion functions to work as aggregates. Therefore, as compared with a sealing member made of a carbon single layer, it has a good fastening stress maintaining performance. Furthermore, it is further preferred to use ceramics as the inner portion since ceramics have a good heat resistivity and show a good adhesion properties with respect to the carbon outer portion.

DESCRIPTION OF THE PREFERRED EMBODIMENTS

At first, a composite sealing material disclosed in the above identified prior application and a sealing member formed by using the composite sealing material will be explained.

Figure 1:
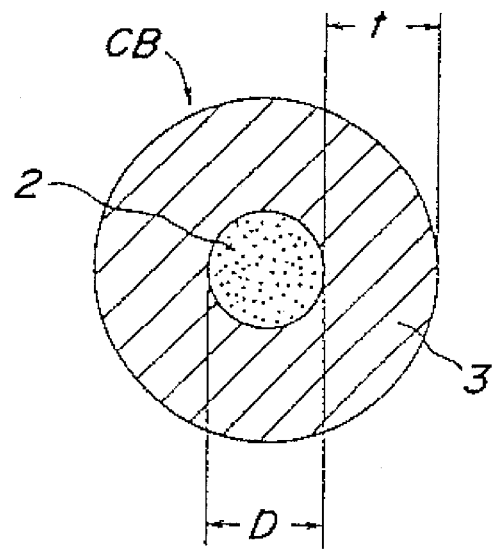
FIG. 1 is a schematic view showing one embodiment of a composite sealing material according to the invention.

FIG. 1 is a schematic view showing a pellet CB as one embodiment of the composite sealing material according to the invention. The pellet CB includes a substantially spherical ceramic grain 2 surrounded with a carbon layer 3 in a spherical-cell shape. It is preferred to use a natural graphite as the carbon layer 3. The ceramic grain 2 may be composed of porcelain, alumina, silicon nitride, zirconia, carbon or the like. The diameter of the ceramic grain 2 is about more than 0.5 mm. The diameter of the pellet CB is about 1~10 mm.

Moreover, if it is assumed that a fastening stress in the formation of a packing system by using the pellet CB is 200~500 kg/cm$^2$, it is preferred to use the ceramic grain 2 having a compression stress of more than 500 kg/cm$^2$. Further, a thickness of the carbon layer 3 is preferably substantially equal to or greater than one-half of the diameter D of the ceramic grain 2 ($t \geq D/2$).

Figure 2:
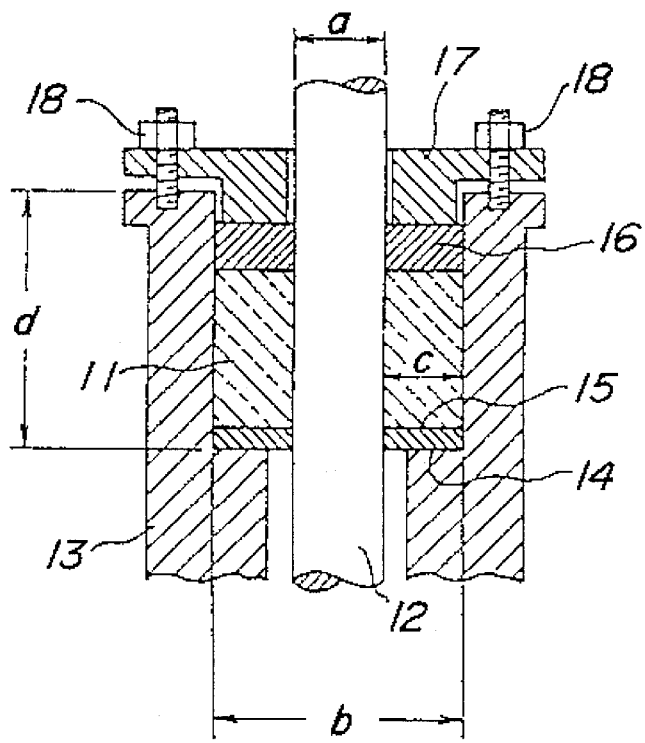
FIG. 2 is a schematic view illustrating one embodiment of a packing system using the composite sealing material according to the invention.

FIG. 2 is a schematic view showing one embodiment of a sealing member of a vapor valve used in thermal power plants and the like, which uses a packing 11 made of the composite sealing members shown in FIG. 1. In the embodiment shown in FIG. 2, in order to seal a stem 12, the packing 11 is formed by arranging an end ring 15 on a step portion 14 of a packing box 13, arranging a number of the composite sealing members and a metal ring 16 on the end ring 15, and fixing a packing plate 17 by a number of bolts 18 to apply a stress in the packing box 13. In FIG. 2, one example of actual dimensions is as follows; stem diameter a: 20 mm, box inner diameter b: 33 mm, box width c: 6.5 mm, box depth d: 40 mm.

As mentioned above, the composite sealing material according to the invention has at least a carbon outer portion. The features of the invention (first to fourth aspects) are to improve the carbon outer portion. Hereinafter, the features of the invention will be explained one by one.

(1) Bulk density of the carbon outer portion (first aspect):

Various tests were performed with respect to the packing systems using composite sealing materials prepared by varying a bulk density of the carbon outer portion. As a result, it was understood that the bulk density of the carbon outer portion depends on packing properties such as sealing performance, fastening stress maintaining performance, sliding performance and shape preserving performance, and that the bulk density must be set in a range of 0.3~2.0 g/cm$^2$, preferably set in a range of 0.5~1.5 g/cm$^2$. Hereinafter, actual embodiments according to the first aspect of the invention will be explained.

At first, the composite sealing materials according to the invention having the construction shown in FIG. 1 were prepared by arranging the carbon layer 3 having various bulk densities and a thickness of 2.00 mm around the alumina grain 2 having a diameter of 2.0 mm. Then, the packing 11 was formed by using the composite sealing members as shown in FIG. 2. After that, various packing properties of the thus formed packings 11 such as sealing performance, fastening stress maintaining performance, sliding performance of the packing and shape preserving performance of the composite sealing material were measured.

In this case, the sealing performance means a performance for preventing a leak of a fluid (such as vapor, water, oil or the like) by the packing 11, and is estimated by an occurrence rate of fluid leak during a predetermined period. The fastening stress maintaining performance is estimated by a fastening stress after 150 hours with respect to an initial fastening stress (400 kg/cm$^2$). The sliding performance is estimated by the number of poorly operated actuators after the packing formation. The shape preserving performance means connectability of the carbon outer portion of the composite sealing material, and is estimated by a carbon weight maintaining rate after a vibration test during 3 minutes by using a roating and tapping shaker. The results are shown in Table 1. It should be noted that, if the initial fastening stress was varied in a range of 200~500 kg/cm$^2$, the fastening stress maintaining performance showed the same tendency as that of Table 1. The fastening stress of 200~500 kg/cm$^2$ is actually an applicable range, and the fastening stress outside this range causes a problem in the apparatus.

TABLE 1

| Item | | Bulk density of carbon outer portion (g/cm$^3$) | | | | | | |
|---|---|---|---|---|---|---|---|---|
| | | 0.2 | 0.3 | 0.5 | 1.0 | 1.5 | 2.0 | 2.1 |
| Sealing performance | Number of leak valves | 69/100 | 19/100 | 2/100 | 3/100 | 3/100 | 21/100 | 73/100 |
| Fastening stress maintaining performance (initial fastening stress 400 kg/cm$^2$) | Residual fastening stress (kg/cm$^2$) | 364 (91%) | 340 (85%) | 320 (80%) | 312 (78%) | 312 (78%) | 260 (65%) | 192 (48%) |
| Sliding performance | Number of poorly operated actuators | 80/100 | 21/100 | 5/100 | 3/100 | 3/100 | 0/100 | 0/100 |
| Shape preserving performance | Residual amount of carbon (wt %) | 60 | 78 | 96 | 98 | 100 | 100 | 100 |

From the results shown in Table 1, it is understood that, if the bulk density of the carbon outer portion is less than 0.3 g/cm$^3$, the sealing performance and the sliding performance of the packing and the shape preserving performance of the carbon outer portion become worse, and that, if the bulk density of the carbon outer portion is more than 2.0 g/cm$^3$, the sealing performance and the fastening stress maintaining performance become worse. Therefore, it is understood that the bulk density of the carbon outer portion of the composite sealing material must be set in a range of 0.3~2.0 g/cm$^3$. In the embodiment mentioned above, the shape of the composite sealing material is spheroidal, but the same results can be obtained by composite sealing materials having a flaky shape, massive shape or the like.

In this case, the reason why the sealing performance and the sliding performance of the packing formed by using the composite sealing materials having the bulk density of the carbon outer portion of less than 0.3 g/cm$^3$ are inferior is as follows. That is to say, when the fastening stress applied to the composite sealing materials in the packing box is increased to a predetermined level to form the packing, the bulk density of the carbon outer portion is increased, but the carbon outer portion is reduced in a direction of the applied fastening stress. Therefore, the inner portion, such as an alumina grain, of the composite sealing material is directly brought into contact with the stem.

Moreover, the reason why the sealing performance and the fastening stress maintaining performance of the packing formed by using the bulk density of the carbon outer portion of more than 2.0 g/cm$^3$ are inferior is as follows. That is to say, since the bulk density of the carbon outer portion is very high in this case, the composite sealing material is not deformed by a predetermined forming stress, and thus spaces between the composite sealing materials remain. As a result, the sealing performance becomes worse. Further, when the use of the packing is continued under the bad sealing performance state, the spaces between the composite sealing materials are gradually filled up with the carbon. As a result, the fastening stress maintaining performance becomes worse.

In this case, the bulk density of the carbon outer portion can be controlled by varying manufacturing conditions of the composite sealing material. That is to say, when the composite sealing material is formed by a granulating method such that a binder and a carbon powder are sprayed on a flaky or a massive core member rotated in a vessel having a circular cross section, the bulk density of the carbon outer portion can be controlled by varying the rotation speed of the flaky or massive core member in the vessel or by varying an interval of supplying the carbon and the binder. In this case, it is preferred to use colloidal silica or colloidal alumina as the binder. Moreover, when the composite sealing material is formed by dropping core members having an indefinite shape in a tank in which fluid carbon is accommodated, the bulk density of the carbon outer portion can be controlled by varying a density and a viscosity or the like of the fluid carbon.

In the composite sealing material according to the first aspect of the invention, since the bulk density of the carbon outer portion is limited to 0.3~2.0 $g/cm^3$, the sealing performance, the fastening stress maintaining performance and the sliding performance of the packing formed by using the composite sealing materials can be improved, and also the shape preserving performance of the composite sealing material can be improved.

(2) Mixing members in the carbon outer portion (second aspect):

Various tests were performed with respect to the packing systems using composite sealing materials having a carbon outer portion in which ceramic fibers are mixed. As a result, it was understood that the sealing performance (room temperature and elevated temperature) of the packing formed by using the composite sealing materials, and the shape preserving performance and a handling performance of the composite sealing material were improved. Moreover, the same results can be obtained if carbon fibers are mixed in the composite sealing material instead of the ceramic fibers.

(3) Coating of binder on the carbon outer portion (third and fourth aspects):

Various tests were performed with respect to the packing systems using composite sealing materials having a carbon outer portion on which an oil layer having a fluid state is arranged by coating an oil base binder, on which an inorganic layer having a solid state is arranged by coating an inorganic binder, or on which an organic layer having a solid state is arranged by coating an organic binder. As a result, it was understood in all the packing systems that the shape preserving performance of the composite sealing material was improved. Moreover, in the packing system using the composite sealing material having the oil layer, it was understood that the sliding performance and the sealing performance on room temperature of the packing were improved.

As for materials of the oil layer, use is made of silicon oil, mineral oil and the like. As for materials of the inorganic layer use is made of colloidal silica, colloidal alumina, water glass, bentonite and the like. As for materials of the organic layer, use is made of PVA, phenol and the like. Moreover, the oil layer can be formed by impregnating the oil base binder into the carbon outer portion. The inorganic layer and the organic layer can be formed by spraying the inorganic binder or the organic binder on the surface of the carbon outer portion and drying it.

Hereinafter, actual embodiments according to the second to fourth aspects of the invention will be explained.

At first, the composite sealing materials having the construction shown in FIG. 1 were prepared as the comparative example by arranging the carbon layer 3 having a thickness of 2.0 mm around the alumina grain 2 having a diameter of 2 mm. Then, ceramic fiber mixing examples (second aspect) in which 10 wt % of ceramic fibers are mixed in the carbon outer portion of the comparative example, coating examples (third aspect) in which 3 wt % of oil base binder is included in a surface of the carbon outer portion of the comparative example to form the oil layer, coating examples (fourth aspect) in which 5 wt % of inorganic binder or 5 wt % of organic binder is sprayed and dried up to form the inorganic layer or the organic layer, were prepared.

Then, the packings 11 were formed as shown in FIG. 2 by using the composite sealing members according to the comparative example, the ceramic fiber mixing example, and the coating examples. After that, various packing properties of the thus formed packings 11 such as sealing performance, fastening stress maintaining performance, sliding performance of the packing, and shape preserving performance and handling performance of the composite sealing material were measured. In this case, the sealing performance, the fastening stress maintaining performance and the sliding performance of the packing, and the shape preserving performance of the composite sealing material were measured by the same manner as those of the previous embodiment (first aspect). Moreover, the handling performance of the composite sealing material means extractability from the valve, and is estimated by the measured extracting time. The results are shown in Table 2.

TABLE 2

| | | | Comparative example | Mixing fiber members | Kinds of coatings | | |
|---|---|---|---|---|---|---|---|
| Item | | | | | Oil layer | Inorganic layer | Organic layer |
| Sealing performance | Number of leak valves (%) | Room temperature | 7 | 0 | 0 | 13 | 13 |
| | | Elevated temperature (350° C.) | 13 | 13 | 20 | 16 | 20 |
| Fastening stress maintaining performance (initial fastening | Residual fastening stress/initial fastening | Room temperature | 76 | 85 | 77 | 78 | 77 |
| | | Elevated temperature | 68 | 75 | 51 | 69 | 56 |

TABLE 2-continued

|  |  | Comparative example | Mixing fiber members | Kinds of coatings | | |
| --- | --- | --- | --- | --- | --- | --- |
| Item | | | | Oil layer | Inorganic layer | Organic layer |
| stress 400 kg/cm$^2$) | stress (%) (350° C.) | | | | | |
| Sliding performance | Number of poorly operated actuators | 3 | 10 | 0 | 7 | 0 |
| Shape preserving | Residual amount of carbon (wt %) | 93 | 95 | 92 | 98 | 98 |
| Handling performance | Measured extracting time (minutes) | 6 | 4 | 6 | 5 | 6 |

From the results shown in Table 2, it is understood that the ceramic fiber mixing example (second aspect) shows a good sealing performance of the packing (both room temperature and elevated temperature), and good shape preserving performance and good handling performance of the composite sealing material, as compared with those of the comparative example. Moreover, it is understood that both of the coating examples (third and fourth aspects) show good shape preserving performance of the composite sealing material as compared with that of the comparative example, and that the coating example having the oil layer shows a good sliding performance and a good sealing performance of the packing as compared with those of the comparative example. Further, in the embodiment mentioned above, use is made of a spherical composite sealing material, but the same results as that of the spherical composite sealing material can be also obtained in the composite sealing material with the other shape such as a flaky shape, a massive shape and the like.

In the ceramic fiber mixing example (second aspect), the reason for improving the sealing performance of the packing is that an elasticity of the carbon outer portion is improved by the ceramic fiber mixing. Moreover, the reasons for improving the shape preserving performance and the handling performance of the composite sealing material are that the ceramic fiber functions to eliminate a crumbling of the carbon outer portion and that a seal of the packing is performed by a small fastening stress.

Further, in the coating example having the oil layer (third aspect), the reason for improving the sliding performance and the sealing performance of the packing, and the shape preserving performance of the composite sealing material is that lubricant properties are increased by the use of the oil base binder. Moreover, in the coating example having the inorganic film or the organic film (fourth aspect), the reason for improving the shape preserving performance of the composite sealing material is that the crumbling of the carbon outer portion is eliminated by the formation of the solid inorganic film or the solid organic film on the carbon outer portion.

According to the invention, since the bulk density of the carbon outer portion (first aspect), the mixing component in the carbon outer portion (second aspect), and the coating on the carbon outer portion (third and fourth aspects) are limited, it is possible to improve the sealing properties of the sealing member formed by using the composite sealing materials.

What is claimed is:

1. A composite sealing material having an inner portion and an outer portion enveloping said inner portion, said inner portion having a diameter D, said outer portion comprising at least a carbon base material, wherein said carbon outer portion has a bulk density of 0.3~2.0 g/cm$^3$ and a thickness substantially equal to or greater than D/2.

2. A composite sealing material having an inner portion and an outer portion enveloping said inner portion, said inner portion having a diameter D, said outer portion comprising a carbon base material and having a thickness substantially equal to or greater than D/2.

3. The composite sealing material according to claim 1, wherein said bulk density of said carbon outer portion is 0.5~1.5 g/cm$^3$.

4. The composite sealing material according to claim 2, wherein said outer portion further comprises fiber members mixed therein.

5. The composite sealing material according to claim 2, further comprising an oil layer arranged on said outer portion.

6. The composite sealing material according to claim 5, wherein said oil layer is a liquid.

7. The composite sealing material according to claim 2, further comprising one of an organic layer and an inorganic layer arranged on said outer layer.

8. The composite sealing material according to claim 7, wherein said organic and inorganic layers are solid.

\* \* \* \* \*